Oct. 16, 1962   E. A. PHILLIPS   3,058,511
CONTOURED STRUCTURAL METALLIC SHEET AND
METHOD OF FORMING SAME

Filed Jan. 21, 1960   5 Sheets-Sheet 1

INVENTOR
EARL A. PHILLIPS

BY

ATTORNEY

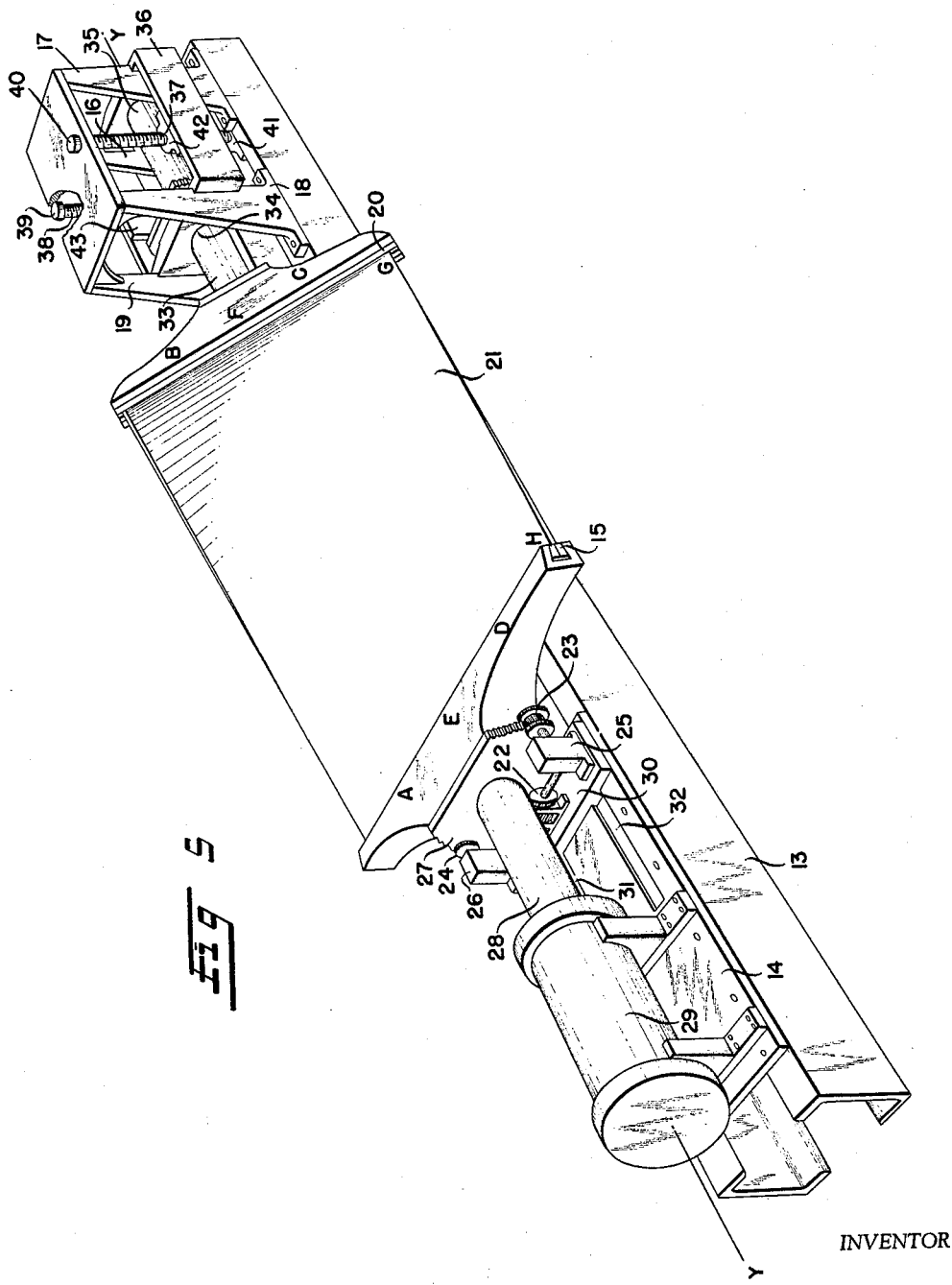

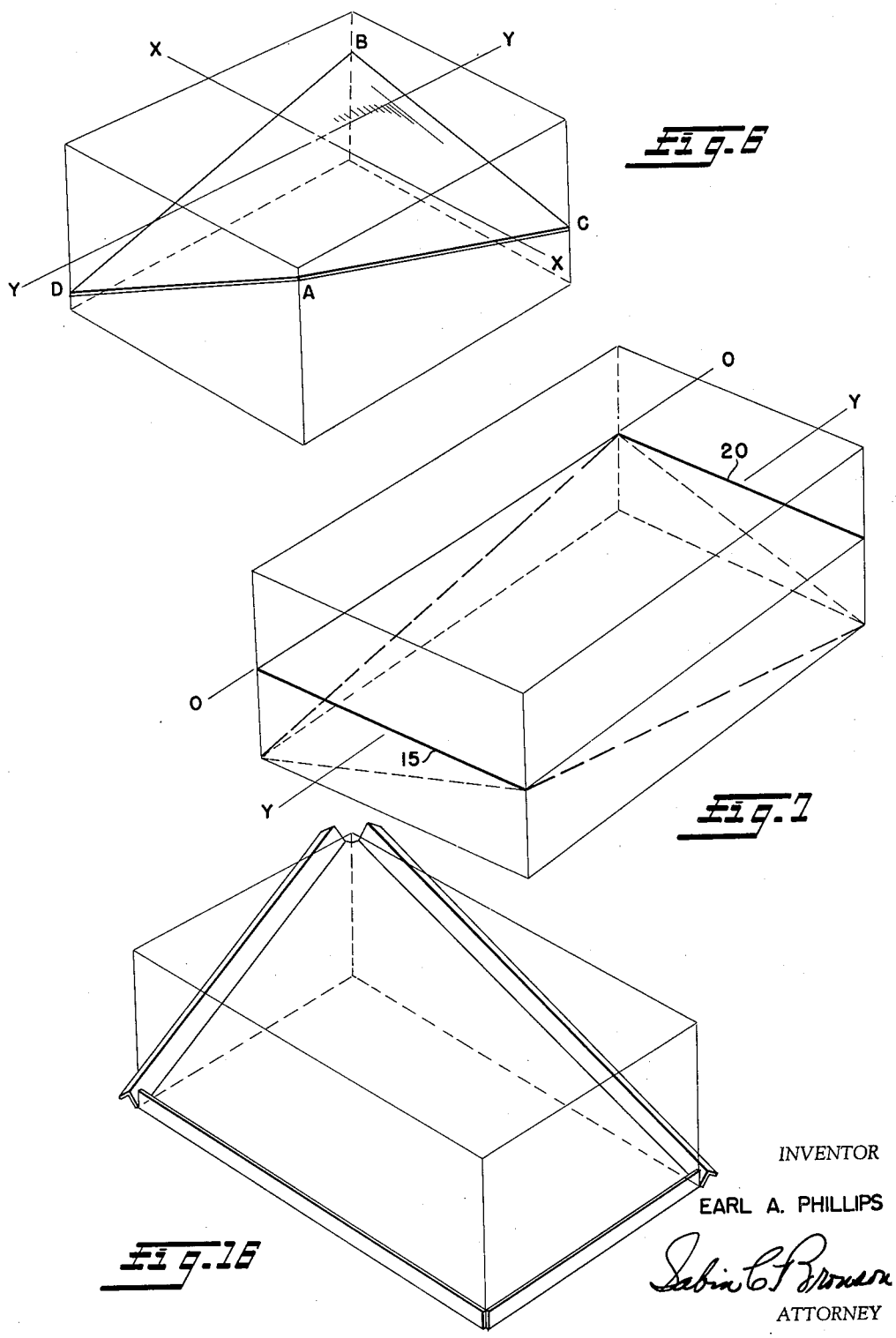

Oct. 16, 1962     E. A. PHILLIPS     3,058,511
CONTOURED STRUCTURAL METALLIC SHEET AND
METHOD OF FORMING SAME

Filed Jan. 21, 1960     5 Sheets-Sheet 4

INVENTOR
EARL A. PHILLIPS

*Sabin C. Bronson*

ATTORNEY

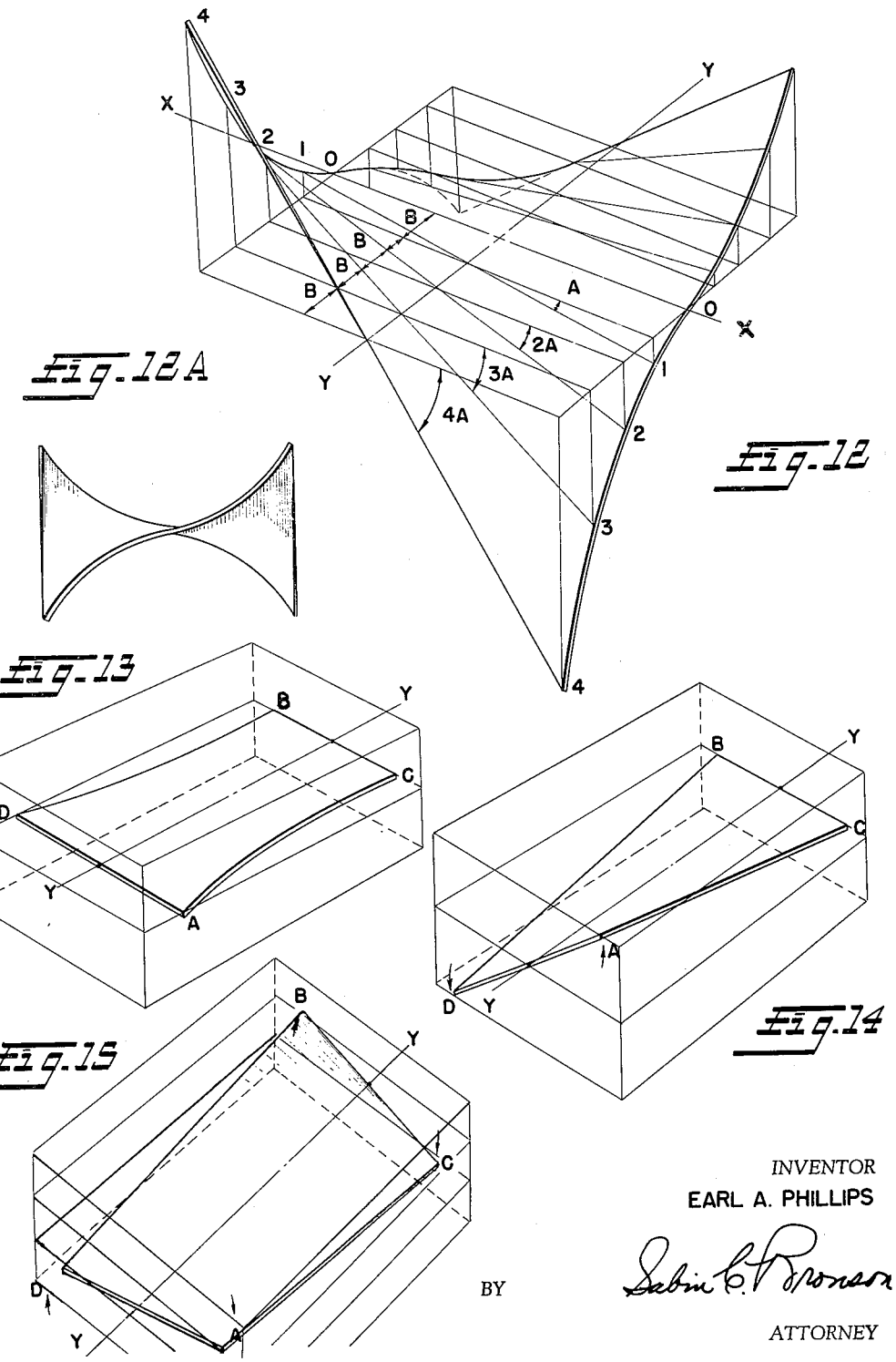

3,058,511
CONTOURED STRUCTURAL METALLIC SHEET
AND METHOD OF FORMING SAME
Earl A. Phillips, La Grange Park, Ill., assignor to Standard Railway Equipment Manufacturing Company, Chicago, Ill., a corporation of Delaware
Filed Jan. 21, 1960, Ser. No. 3,760
7 Claims. (Cl. 153—6)

This invention relates to a particular metallic shape and especially to a method of forming the same. Specifically, the invention comprises a four-sided contoured structural metal sheet which has been stretch formed and which in some cases is a hyperbolic paraboloid and in other cases is an approximation to a true hyperbolic paraboloid. Occasionally in this description, the term quasi-hyperbolic paraboloid will be used to denote the latter.

Heretofore the hyperbolic paraboloidal geometry has been employed very little in metal, largely because of the difficulty of forming such sheets by common methods, i.e., pressing, stretching over a die, or casting. For shallow warped hyperbolic paraboloids, or quasi-hyperbolic paraboloids, the pressing method using matched dies is not applicable because of the large springback associated with the method and the resulting difficulty in maintaining tolerances. If the metal is stretched over a die, which is a common method used in forming shallow contoured sheets, a different die must be prepared for each variation in sheet geometry. This latter disadvantage applies also to the pressing and casting methods.

This invention eliminates this disadvantage by employing solely the stretch method without the use of dies. The metal sheet is given its hyperbolic paraboloidal shape by combining a twist of the jaws holding opposite ends of the sheet with the stretch, which stretch is just beyond the elastic limit of the metal. This method also has the advantage that the springback occurring when the metal is released from the stretching and twisting jaws has negligible influence on distorting the shape from that desired.

The object of the invention is to provide a method and means of forming metallic hyperbolic paraboloidal or quasi-hyperbolic paraboloidal sheets by stretch forming and twisting without the use of dies, resulting in improved physical properties of the metal due to cold working, and the elimination of wrinkles and distortions in the material, providing smooth, gently curving surfaces.

Other objects and advantages of the invention will appear in the following description thereof.

Referring now to the accompanying drawings forming part of this application illustrating a preferred embodiment of the invention, wherein FIG. 1 illustrates a general type of hyperbolic paraboloid with two diagonally opposite corners in one plane, and the other two diagonally opposite corners in another spaced parallel plane and shown in association with a rectangular parallelepiped.

FIG. 5 is a perspective view of the jaws and operating mechanism therefor of a stretch forming press showing one of the sheets comprising the invention partially formed.

FIG. 6 shows, in relation to a parallelepiped, a subsection of the hyperbolic paraboloid of FIG. 1 wherein the corners are each in a different parallel plane.

FIG. 7 shows a hyperbolic paraboloidal sheet formed by rotating one of the jaws a stretch forming press clockwise about an axis coincident to a side of the sheet, and rotating the other jaw counterclockwise about an axis coincident with the opposite side of the sheet until diagonally opposite corners are in spaced parallel planes.

FIG. 12 is a perspective view of a helicoidal surface, showing the development thereof.

FIG. 12A is an end elevation of FIG. 12.

Figure 13A:
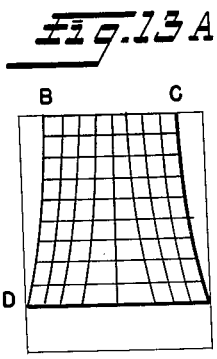
FIGS. 13, 14 and 15 illustrate successive steps, respectively, of forming a quasi-hyperbolic paraboloidal sheet in an alternate type of stretcher machine.
Figure 14A:
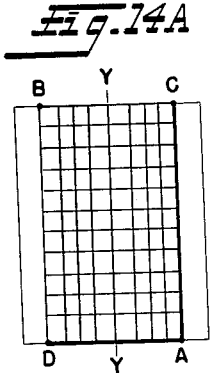
Figure 15A:
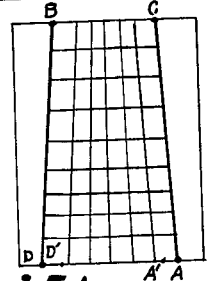

FIGS. 13A, 14A, and 15A show plan views, respectively, of the sheets shown in FIGS. 13, 14, and 15.

FIG. 16 shows in relation to a rectangular parallelepiped a typical hyperbolic paraboloid with 90° bent-up flanges along its two lower edges and inverted V flanges along its two sloping edges.

Figure 1:
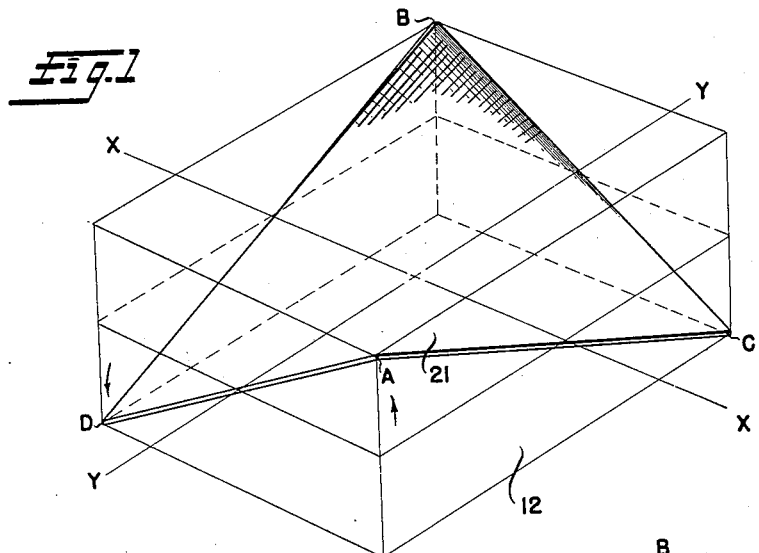

A hyperbolic paraboloidal surface has the property of being developable from a network of straight lines. If we imagine a series of straight lines drawn between opposite sides of the surface shown in FIG. 1 so that when viewed in plan as in FIG. 2, such lines, if infinitely close together, will form a hyperbolic paraboloidal surface. Every point on the two lines X—X and Y—Y is in the same plane, which plane, in FIG. 1, is midway between the top and bottom surfaces of the parallelepiped 12.

*Characteristics of a Hyperbolic Paraboloidal Sheet as a Structural Element*

This invention concerns a method in which hyperbolic paraboloidal and quasi-hyperbolic paraboloidal surfaces of any width, length or degree of warp within the maximum limits of the machine may be formed without dies in any material which can be permanently stretched, preferably metal.

The advantages of this type of geometric shape as a load carrier have long been recognized and studied both experimentally and mathematically. It has been used in a number of structures, more especially in those employing wood or concrete, since its "straight line" composition has made possible relatively simple wood framing and forming.

The most apparent structural advantage can be visualized with reference to FIG. 1. If the four edges of the surface are attached to a stiff rectangular frame and a distributed downward load is applied to the surface in a direction perpendicular to the plane of axes X—X and Y—Y, such load will be transmitted to the edge frame in the form of tension along lines essentially parallel to the direction from A to B and compression along lines essentially parallel to the direction from C to D. This follows because of the "suspension cable" type shape of the tension lines and "arch" (convex upward) shape of the compression lines. Thus, everywhere along the points of attachment to the edge frame both tension pulls and compression pushes are experienced in opposing diagonal directions. These substantially cancel each other in a direction normal to the edges so that there is little tendency for the loaded surface to pull away from, or push toward, the frame. Instead, only a sidewise load parallel to each edge is delivered to each edge. The connection problem between the surface and the frame becomes less critical as a result of this.

The Method of Forming the Sheets

Figure 3:
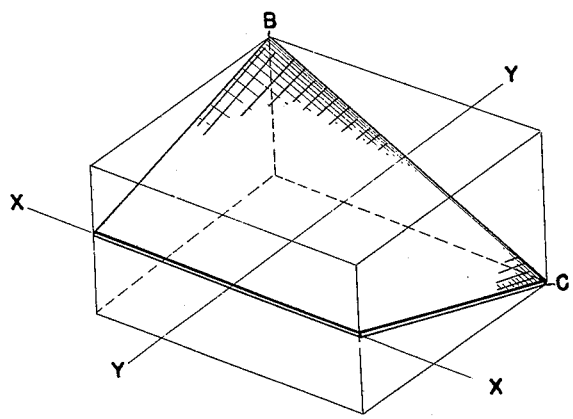
FIG. 3 shows the hyperbolic parabolodial surface resulting from either half of the sheet of FIG. 1 cut along axis X—X and shown in association with a rectangular parallelepiped.
Figure 4:
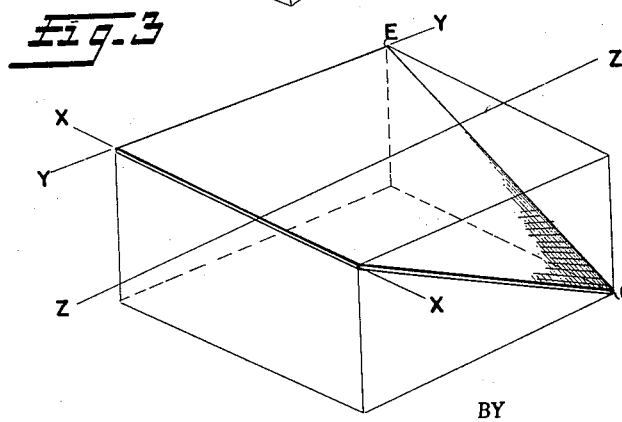
FIG. 4 shows the hyperbolic paraboloidal surface resulting from one-fourth of the sheet of FIG. 1 cut along axes X—X and Y—Y.

FIG. 5 shows a schematic view of a stretcher press which will straightforwardly form the sheets shown in FIGS. 1, 3 and 4. There are many types of stretcher presses commercially available, all of which are designed to be used with dies. The machine in FIG. 5 could conceivably be one of these with the die element removed and some modifications made to permit the particular jaw movements shown.

It is also significant that the particular combination of jaw movements made possible by the arrangement shown in FIG. 5 is not the only one which will accomplish the desired result. Other possible combinations will be discussed later.

The machine of FIG. 5 consists of a base frame 13 on which is rigidly mounted a plate 14, which supports the mechanism associated with jaw 15, and four vertical supports 16, 17, 18 and 19 which partially support the mechanism associated with jaw 20.

The hyperbolic paraboloidal sheet 21 is shown secured to jaws 15 and 20 by suitable clamping means and is in a stretched configuration with jaws so oriented as to duplicate the surface shown in FIG. 3. Thus edge X—X in FIG. 3 is coincident with jaw 15, and corners B and C are coincident with the extremities of jaw 20. Line Y—Y in FIG. 3 is coincident with the central axis of the machine, also labeled Y—Y in FIG. 5.

Now jaw 15 is shown to be capable of rotating about axis Y—Y and translating along axis Y—Y. The rotation is accomplished by motor 22 which drives pinions 23 and 24 through gear reduction units 25 and 26. These pinions rotate in the same direction and are in contact with segment gear 27. This gear is mounted concentric with axis Y—Y and is rigidly attached to jaw 15 and also to the piston rod 28, and hence jaw 15 is rotatable about axis Y—Y through this mechanical arrangement.

For translating jaw 15 along axis Y—Y, the piston rod 28 is operated in a "push-pull" sense by cylinder 29. Now motor 22 and gear reduction units 25 and 26 are rigidly mounted on a common base plate 30 which can slide parallel to axis Y—Y in ways 31 and 32; thus, when the piston rod 28 moves along axis Y—Y, this jaw rotation mechanism can translate parallel with the piston rod. The flanges on pinions 23 and 24 provide the means by which this rotating mechanism is caused to follow the translating motion of the jaw and piston assembly.

Jaw 20 is shown to be capable of rotating about axis Y—Y and in addition to be capable of translating vertically in a direction perpendicular to axis Y—Y. The system envisioned here for accomplishing this shows jaw 20 rigidly attached to shaft 33 which is rotatably mounted concentric with axis Y—Y in bearings at 34 and 35. Said bearings are also thrust bearings which prevent axial motion of the shaft 33 and jaw 20 along axis Y—Y. Said bearings are mounted in the rectangular frame 36, which in turn can be driven up and down in ways running along the rear vertical edges of supports 16, 17, 18 and 19, in a manner to be explained, thereby producing the desired vertical translation of jaw 20. This vertical drive system consists of worm screws 37 and 38 which are mounted rotatably in bearings 39 and 40 and two other bearings at the base of the machine, one of which is visible as 41. These four bearings are mounted in blocks which are rigidly attached to the stationary components of the machine.

Nuts shown at 42 and 43 are thus caused to ride up and down on worm screws 37 and 38 when these latter are rotated. The nuts are secured rigidly to frame 36, hence this frame and the jaw 20 are driven vertically when the worm screws are rotated. A conventional motor-gear-reducer drive system installed at the base of the machine can drive these worm screws.

The various jaw movements required to form the sheets of FIGS. 1, 3 and 4 are as follows: To form the surface of FIG. 1, jaw 15, which is coincident with edge AD, is rotated counterclockwise about axis Y—Y when viewed from lower left to upper right in FIG. 5; and jaw 20, which is coincident with edge BC, is rotated clockwise about axis Y—Y when viewed along the same direction.

To form the surface of FIG. 3, the jaws are positioned exactly as shown in FIG. 5 with jaw 15, which is coincident with axis X—X in FIG. 3, remaining horizontal (not rotated), and jaw 20, which is coincident with edge BC, rotated clockwise about axis Y—Y.

Finally, to form the surface of FIG. 4, jaw 15, which is coincident with axis X—X in FIG. 4, is kept horizontal (not rotated), and jaw 20, which is coincident with edge CE, is first rotated clockwise about axis Y—Y in FIG. 5 and then lowered vertically until its upper corner is at the same elevation as jaw 15. Axis Y—Y in FIG. 5 is then coincident with axis Z—Z in FIG. 4.

Clearly, any other quarter-section or half-section of the surface shown in FIG. 1 can also be made through suitable movements of the two jaws 15 and 20. In a more general sense, any subsection of the surface in FIG. 1 can also be made as, for example, the surface of FIG. 6 in which each corner is at an elevation different than each of the others.

As previously mentioned, the machine does not have to provide the particular combination of jaw motions shown in FIG. 5 to be capable of producing the various hyperbolic paraboloidal forms required. For example, jaw 15 might be made capable of translating vertically, in addition to translating parallel to and rotating about axis Y—Y; and in this case, jaw 20 need only be capable of rotating about axis Y—Y. Or, referring to FIG. 7, with jaw 15 having the same capabilities as just described, the desired results can be obtained if jaw 20 is made capable of rotating about an axis parallel, but non-coincident, with axis Y—Y, say axis O—O. The stretching tension is still applied along axis Y—Y. In this case to obtain the surface of FIG. 1, jaw 15 can be rotated counterclockwise about axis Y—Y and lowered vertically slightly while jaw 20 can be rotated clockwise about axis O—O, thus arriving at the dashed line configuration illustrated.

The most simple of all jaw motion capabilities which will produce hyperbolic paraboloidal shapes is, in fact, one in which one jaw remains absolutely stationary and the other merely rotates about an axis passing through the centers of both jaws and then moves to pull the sheet in tension. This arrangement, however, has some disadvantage which will be explained later.

If hyperbolic paraboloidal sheets of narrower widths than that shown in FIG. 5 are desired, it is only necessary to install the sheets in a portion of the jaws. For example, a sheet installed between points A, B, C and D will have the shape shown in FIG. 3 but will be somewhat narrower than the complete sheet shown in FIG. 5. If a sheet is installed between the points E, F, G and H, it will have the shape shown in FIG. 4, but will be narrower than the complete sheet. Such an installation will set up eccentric loads in the structural elements of the machine which will be unobjectionable if such elements are designed with sufficient strength. A further disadvantage of this latter arrangement is that only a portion of the total width capacity of the machine is available.

To produce sheets of shorter or longer lengths than the sheet shown in FIG. 5, it is only necessary to use a different portion of the piston rod travel or, if considerable change in length is desired, to relocate base plate 14 and its attached assemblies along the Y—Y direction.

Now consider the amount of stretch that must be applied to form a hyperbolic paraboloidal shape such as, for illustrative purposes, the surface in FIG. 1. It is evident that the edge lines AC and BD are longer than the central line along axis Y—Y. As the sheet is stretched, these edge lines will yield first, and yielding will gradually progress toward the central line. When all lines up to the central line have yielded and have become straight lines, the required shape will have been obtained. Any further stretch will not destroy the hyperbolic paraboloidal shape, but will simply impart to the final shape a different length to degree-of-warp ratio.

It is further noted that one necessary condition for the production of a hyperbolic paraboloidal surface which is rectangular when viewed in plan, such as those shown in FIGS. 1, 3, 4 and 6, is that the two jaws, in their final position after forming the surface, be parallel when viewed from any direction perpendicular to the axis of the stretch Y—Y. It will be shown in the next section that, except for some precautions that must be taken in preparing the original sheet blank to avoid wrinkling of the sheet during forming, it is immaterial how the jaws move to arrive at their final configuration.

*Some Geometric Considerations and Relationship to Wrinkling of the Sheet During Stretching*

Figure 2:
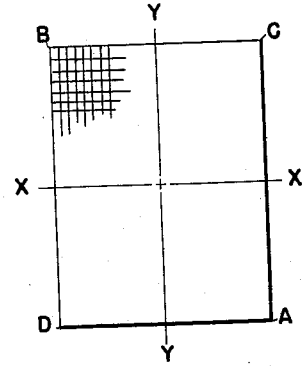
FIG. 2 is a plan view of the hyperbolic paraboloid shown in FIG. 1 showing the development of this geometric surface from a network of straight lines.

In most applications, a rectangular shape when viewed in plan, as in FIG. 2, is required. Some considerations of geometry will show how this rectangular shape is obtained, and also why some pretrimming of the sheet is necessary to avoid wrinkling during stretching.

Figure 8:
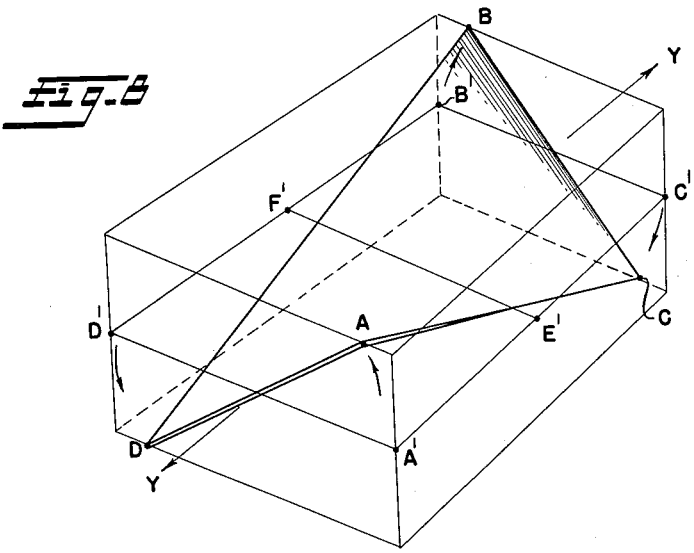
FIG. 8 is a view similar to FIG. 1 showing the sheet in final warped form in association with a rectangular parallelepiped, the original size of the flat sheet after stretching but before twisting having been equal to the top surface of the parallelepiped.
Figure 9:
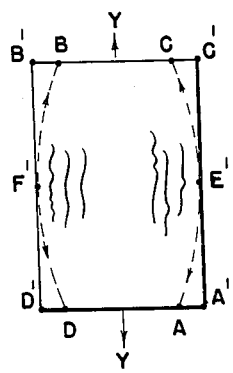
FIG. 9 is a top plan view of the sheet shown in FIG. 8, illustrating the wrinkles that form in a rectangular sheet if not precut to avoid same.
Figure 10:
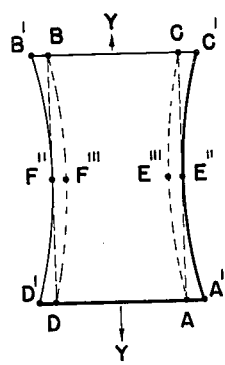
FIG. 10 is a plan view of a flat sheet, precut to have concaved sides as shown, so that when formed by first twisting and then stretching to the shape shown in FIG. 8, the plan view will be a perfect rectangle with no wrinkles in the sheet.

For illustrative purposes, suppose that the sheet shown in FIGS. 1 and 2 is desired. This sheet is again shown in its final warped configuration as sheet ADBC in FIG. 8. To arrive at this final shape, suppose an initially perfectly rectangular sheet is installed in the jaws before they are rotated as indicated by A'D'B'C' in FIGS. 8 and 9, FIG. 9 being a top or plan view of FIG. 8. The jaws are represented before rotation by lines A'D' and B'C' and the stretch axis is along Y—Y. When the jaws are rotated about axis Y—Y, points A', B', C', D' move to A, B, C, D, respectively, as shown by the arrows in FIG. 8; points E' and F' remain fixed, and the twisted sheet is now represented in FIG. 9 by the dashed shape ADF'BCE'A. When the sheet is now stretched in the Y—Y direction it is clear that longitudinal wrinkles will develop as shown in FIG. 9 due to the lateral inward component of the tensile forces shown along the two longitudinal side edges BF'D and CE'A. These wrinkles can be avoided if the unformed sheet, before installation in the jaws, is precut concavely inward along these longitudinal edges as shown by the solid lines A'D'F"B'C'E"-A' in FIG. 10, which is another plan or top view. If this type of sheet is installed in the jaws, and the jaws are rotated, points A', B', C', D' move to A, B, C, D, respectively as before, and points E" and F" remain fixed; and, if the concavity of the pretrim is sufficient, the pure rectangular shape shown by the dashed lines as ADF"-BCE"A in FIG. 10 will result. The stretching process may now be applied with no resulting wrinkle formation.

The process is, however, complicated slightly over that just explained because of the tendency for all stretched materials to "pull or neck-in" laterally when stretched longitudinally. Thus, in FIG. 10, when the rectangular sheet ADF"BCE"A is stretched, the central portion will become narrower while the end portions at the jaws will remain at their initial widths because of the fixity of these ends in the jaws, and the final shape will have the dotted contour ADF'"BCE'"A. The amount of this lateral pull-in is usually between 1/3 and 1/2 of the amount of the longitudinal stretch. The final twisted sheet will then have to be trimmed to the width of the "necked-in" central section between E'" and F'".

Figure 11:
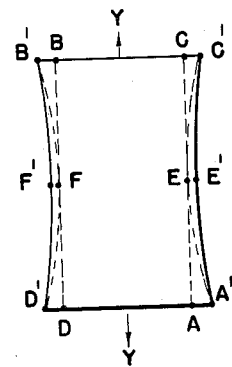
FIG. 11 is a view similar to FIG. 10 showing in full lines a sheet, precut so that when formed by first stretching and then twisting to the shape shown in FIG. 8, the plan view will be a perfect rectangle without wrinkles in the sheet.

To avoid this final trim and associated loss of material, it is possible to reverse the sequence of the twisting and stretching operations. Thus, suppose as shown in FIG. 11, which is another plan or top view, that the initial sheet has the solid line shape A'D'F'B'C'E'A', which comprises a slight concave trim as shown. After stretching along axis Y—Y, it takes the shape A'D'FB'C'EA' due to the lateral contraction through the central section of the sheet. Now, when the jaws are rotated, points A', B', C', D' move to A, B, C, D respectively and the pure rectangle ADFBCEA results.

Thus, by stretching before twisting, the degree to which the longitudinal sides have to be concavely pretrimmed to prevent wrinkles is reduced because of the additional lateral contraction introduced by the stretching process.

The geometry of the pretrim and the geometry associated with the various steps of forming can be studied in a similar manner for other types of hyperbolic paraboloids, such as those shown in FIGS. 3, 4, and 6.

*Intentional Wrinkles*

As just stated, when a true rectangular sheet is twisted before stretching, it will have the convex shape shown by the dashed lines in FIG. 9; and the subsequent stretching will produce longitudinal wrinkles. In some applications such wrinkles may actually be desired for either additional strength or appearance or both. If, in fact, the sheet is pretrimmed convexly along its longitudinal edges, an even more severe accentuated group of wrinkles can be produced. These wrinkles always run longitudinally in the direction of the stretch forces, and their depth is a function mainly of the amount of longitudinal convexity existing during stretch. These wrinkles also are deeper through the central portion of the sheet and shallower toward the ends of the sheet at the jaws.

*Comparison of Hyperbolic Paraboloid with a Helicoid*

If a long thin bar of material is clamped at its ends in rotatable jaws, the well known helicoidal, or "twisted ribbon" shape will be produced if the jaws are rotated in opposite senses. Except for the stretching process, this is similar to the aforedescribed method of forming a hyperbolic paraboloid and hence it might be concluded that the hyperbolic paraboloid is, in reality, only a segment of a helicoid. A close examination will show that there is a distinct difference between these two shapes. Of particular importance, it will be shown that the helicoid does not have the advantageous property of being composed of a rectangular gridwork of straight lines wherein edges parallel to the gridwork can be easily trimmed or flanged by simple straight shears and V dies.

A helicoidal surface is shown in perspective in FIG. 12 and is developed as follows: A straight line 0—0 is laid out along the X—X axis, equally extended in each direction away from the Y—Y axis, which latter axis is perpendicular to the X—X axis. At a distance B in one direction along the Y—Y axis a second line 1—1 is drawn normal to and through the Y—Y axis, also extended equally in both directions away from the Y—Y axis, and rotated by an angle A from the plane of the X—X and Y—Y axes. Similarly, at a distance 2B along the Y—Y axis a third line 2—2 is drawn; and it is rotated by an angle 2A from the plane of the Y—Y and X—X axes. If this process is continued to include an infinite number of such lines, wherein each line has the property that its angle of rotation out of the plane of the X—X and Y—Y axes is directly proportional to the distance from the X—X axis to the point where the line intersects the Y—Y axis, then a helicoidal surface is developed. The common form of such a surface occurs when each line 0—0, 1—1, 2—2, etc., is of equal length, in which case the well known "spiral" ribbon shape results. This spiral shape is produced in metals by twisting long strips.

The helicoid is mathematically an entirely different surface than the hyperbolic paraboloid, and this difference can be visualized physically by comparison of FIGS. 1 and 12. In the hyperbolic paraboloid of FIG. 1, lines running in the surface perpendicular to the X—X axis are straight lines, and points along any one of these lines are elevated out of the planes of the X—X and Y—Y axes an amount which is directly proportional to their distance from the X—X axis. In the helicoid of FIG. 12, lines running in the surface perpendicular to the X—X axis are not straight lines; i.e. line 0—1—2—3—4. This follows because the angles of rotation about the Y—Y axis of the generating lines 0—0, 1—1, 2—2, etc., of the helicoid change at a constant rate along the Y—Y direction, and as is known from trigonometry, the slopes of these lines do not correspondingly change at a constant rate. In the hyperbolic paraboloid the reverse is true; the slopes change at a constant rate but the angles do not.

Referring now to the forming process, if a long flat bar of material is placed in the jaws of the machine in FIG. 5, and the jaws are rotated slightly in opposite senses, the resulting surface will be helicoidal; when, however, the surface is further stretched by the jaws, the longitudinal curved lines running along the surface perpendicular to the jaws are pulled into straight lines by the plastic or yielding action associated with the stretch, and the hyperbolic paraboloidal surface results. Therein lies the difference.

As previously discussed, in order to obtain the hyperbolic paraboloid shape, it is necessary to apply sufficient stretch to render each of these curved lines straight. From observation of FIG. 1, it is seen that the central line along the axis of pull Y—Y will be stretched the least since it is the shortest line in the final formed sheet; the edge lines AC and BD will be stretched the most. Whether the stretching is performed after the twisting or the twisting after the stretching, the outer edge lines will always yield first with yielding progressing inward along successive lines until the central line along Y—Y is reached.

*A Simplified Method of Forming the Sheets*

A very much simplified mechanical stretcher arrangement over that shown in FIG. 5 will produce surfaces that are also true hyperbolic paraboloids; however, when a sheet is formed by this process to be described, and then trimmed so as to appear rectangular when viewed in plan as in FIG. 2 one or more of its four edges will be slightly curved when not viewed in plan. Consequently, if any such curved edge is flanged with a straight die or attached rigidly to a straight frame, the hyperbolic paraboloidal contour of surface will be slightly deformed in the vicinity of this edge. For many applications, this small deviation may not be important, and the economy of producing sheets with the simplified machine may be justified.

This simplified forming process will be described with reference to FIGS. 13 through 15 and 13A through 15A. In this scheme, one jaw of the stretcher press remains completely stationary throughout the entire forming process, and the other jaw translates to produce the stretch and rotates to produce the twist. Suppose the surface shown in FIG. 1 is desired. In FIG. 13, let the unformed sheet be clamped by a stationary jaw along edge BC and a translatable and rotatable jaw along edge AD.

The sheet has been pretrimmed as shown in the plan view in FIG. 13A.

Now let jaw AD translate parallel to the stretch axis Y—Y, then rotate about this same axis, thus completely forming the true hyperbolic paraboloid shown in FIG. 14. This surface is similar to the half of the surface in FIG. 1 bounded by the X—X axis and side AD. In FIG. 14A, the plan view of the formed sheet has a true rectangular appearance; and straight lines forming a rectangular gridwork, if drawn on the sheet in this plan view, are also straight lines running on the formed surface. Such lines would have the appearance shown in FIG. 13A on the unformed sheet.

To arrive at the final desired shape shown in FIG. 1, the sheet in FIG. 14 is now removed from the jaws and rotated clockwise rigidly about axis Y—Y until corners C and D are at the same elevation. Corners A and B will simultaneously arrive at an elevation disposed upward above axis Y—Y an amount equal to the downward disposition of the elevation of corners C and D. The result is seen in FIG. 15 and, while the surface is a true hyperbolic paraboloid, it is not rectangular in plan view as FIG. 15A shows. Corners B and C have moved slightly inward toward axis Y—Y by virtue of the rotation, and corners A and D have moved outward. The previously rectangular gridwork now has the fan shaped appearance shown. Thus, it is not quite the same as the surface shown in FIG. 1 which was truly rectangular in plan view.

If it is now made rectangular in plan view by trimming sides BD and AC parallel to axis Y—Y in FIG. 15A, the new side edges BD' and CA' will be slightly curved if viewed from any direction other than the plan view in FIG. 15A. This is because the trim lines cut across the fan shaped longitudinal straight-lined gridwork shown in FIG. 15A.

Thus, as previously stated, when the slightly curved sides BD' and CA' are flanged with a straight die or attached to a straight frame, they will be forced straight and portions of the sheet neighboring these edges will be slightly deformed away from a true hyperbolic paraboloid.

As just seen, a machine with one stationary jaw and one rotatable and translatable jaw can produce the shape in FIG. 3 directly without encountering the difficulties mentioned but cannot produce the shape in FIG. 1. It can, however, also produce the shape in FIG. 4 without encountering curved edge difficulties if one-half of each jaw is used; i.e. the halves bounded by the Y—Y axis and edge AC in FIG. 14. Here the width capacity of the machine is reduced by half, however, and eccentric loads will be produced in the structural elements of the machine which must be accounted for in the design of the machine.

*Left and Right Handed Hyperbolic Paraboloids*

Suppose the shape shown in FIG. 1 is called a right-handed hyperbolic paraboloid. Note that if the surface is rotated 180 degrees about an axis perpendicular to and passing through the intersection of axes X—X and Y—Y, an identical right-handed hyperbolic paraboloid results. To obtain a left-handed hyperbolic paraboloid, it is necessary that the jaws along AD and BC be rotated in opposite senses to where all corners are reversed in elevation. Thus, in manufacturing various sets of, say roof sheets of hyperbolic paraboloidal contours two separate machine settings apparently must be made.

It is interesting to note however that there is a method in which any right-handed hyperbolic paraboloid can be made into a left-handed hyperbolic paraboloid, or vice versa, without reversing the jaw settings. Note that if corners A and C were reversed in elevation, the distance between them would remain the same. The same is true for all other pairs of corners. Also, in going from the right-handed shape shown to a left-handed shape, the central lines along X—X and Y—Y do not move. Further examination will show that all straight lines in the sheet maintain their length in going through the transition.

Thus, if the degree of warp is not too severe, the sheet may be transposed from one hand to the other by a simple snap action wherein lines X—X and Y—Y are held fixed by suitable means and the edges and corners are forced slightly until the sheet snaps into its other natural shape.

A Particular Hyperbolic Paraboloidal Sheet

Because each of the hyperbolic paraboloidal shapes shown in FIGS. 1, 3, 4, and 6 have straight edges, these edges may be easily flanged in various ways to provide edge stiffness in the sheet. FIG. 16 shows a typical hyperbolic paraboloid with 90° bent-up flanges along its two lower edges and inverted V flanges along its two sloping edges.

Many other flanging arrangements are possible to adapt the panels to other types of partially or completely self-supporting applications. The flanges can be of the 90° L type to provide flat surfaces for riveting or bolting; they can be of the "seam-cap" type (inverted V or U) for overlapping for weathersealing; or they can be of a high stiffness type with bends so distributed as to provide great resistance against bending loads for self-supporting applications. Such sheets can thus provide either partially or totally their own frames, and, as a result, can be mounted, for example, as roof sheets on simple uprights combined with a minimum of separate framing.

I claim:

1. The method of forming a hyperbolic paraboloidal structural unit from a flat sheet of deformable material having substantially straight end edges, of trimming a side edge to concave form, stretching said sheet, and twisting an end edge of said sheet relative to the opposite end edge until the material is twisted and stretched into a surface comprising a series of straight, non-parallel, line elements running between said end edges.

2. The method of forming a hyperbolic paraboloidal structural unit from a flat four sided blank of deformable material, comprising gripping two opposite edges of said blank, rotating one of said gripped edges relative to the other about an axis lying substantially in the plane of said blank, and translating said one edge in a direction substantially parallel to said axis so as to twist and stretch the material into a hyperbolic paraboloidal surface comprising a series of straight, non-parallel, line elements running between the two gripped edges over the length of the sheet.

3. The method set forth in claim 2, wherein the resulting contoured sheet is made up of a series of straight, non-parallel, line elements running over the length of the sheet between two opposite edges, and a second series of straight, non-parallel, line elements running over the width of the sheet between the other two opposite edges.

4. The method of forming a hyperbolic paraboloidal structural unit from a four-sided metallic sheet, comprising the steps of gripping said sheet along opposite side edges, rotating either edge about an axis lying substantially in the plane of the sheet, and translating either edge in directions substantially parallel to said axis and also substantially perpendicular to the plane of the sheet, to stretch and twist said sheet into hyperbolic paraboloidal shape.

5. The method of forming a hyperbolic paraboloidal structural unit from a four-sided metallic sheet, comprising the steps of gripping opposite edges of said sheet, rotating and translating one of said edges in one direction about a central axis running between the center points of each edge, rotating the other edge in the opposite direction about an axis parallel to said central axis and also translating said edge in a direction substantially perpendicular to the surface of said sheet, to stretch and twist said sheet into hyperbolic paraboloidal shape.

6. The method of forming a hyperbolic paraboloidal structural unit from a flat rectangular sheet of material having substantially straight end edges, of gripping opposite edges of said sheet and rotating and translating the edges thereof in opposite directions about a central axis running between the center points of said edges until the material is twisted and stretched into substantially a hyperbolic paraboloidal shape with a series of wrinkles running over most of the sheet in a direction between said end edges.

7. A dieless stretch press for forming a contoured structural unit from a flat sheet of deformable material, comprising spaced jaws for gripping said material at opposite edges, either of said jaws being mounted for rotation about an axis lying substantially in the plane of the sheets, and for translation in a direction substantially parallel to said axis, and for translation in a direction substantially perpendicular to the plane of the gripped sheet.

References Cited in the file of this patent

UNITED STATES PATENTS

| | | |
|---|---|---|
| 2,715,431 | Grossu | Aug. 16, 1955 |
| 2,918,992 | Gelsavage | Dec. 29, 1959 |

FOREIGN PATENTS

| | | |
|---|---|---|
| 1,120,195 | France | Apr. 16, 1956 |
| 692,495 | Germany | June 20, 1940 |
| 261,739 | Great Britain | Pub. date 1926 |
| 472,744 | Great Britain | Sept. 29, 1937 |
| 490,125 | Great Britain | Aug. 9, 1938 |
| 801,888 | Great Britain | Sept. 24, 1958 |

OTHER REFERENCES

Baroni: Engineering News-Record, Jan. 1, 1953, page 25.

Candela: Jour. Amer. Concrete Inst., January 1955, pages 397–415, note particularly page 403.

Candela: Architectural Record, July 1958, pages 191–195, note particularly page 194.

UNITED STATES PATENT OFFICE
CERTIFICATE OF CORRECTION

Patent No. 3,058,511                        October 16, 1962.

Earl A. Phillips

It is hereby certified that error appears in the above numbered patent requiring correction and that the said Letters Patent should read as corrected below.

Column 2, line 7, after "jaws" insert -- of --; column 7, line 3, strike out "where the point"; same column, line 8, after "spiral" insert -- ribbon --.

Signed and sealed this 19th day of March 1963.

(SEAL)
Attest:

ESTON G. JOHNSON
Attesting Officer

DAVID L. LADD
Commissioner of Patents